United States Patent
Sun et al.

(10) Patent No.: US 7,409,926 B2
(45) Date of Patent: *Aug. 12, 2008

(54) CONTROLLING ENGINE OPERATION WITH A FIRST AND SECOND FUEL

(75) Inventors: Harold Sun, West Bloomfield, MI (US); Zafar Shaikh, Troy, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 11/757,690

(22) Filed: Jun. 4, 2007

(65) Prior Publication Data

US 2007/0256665 A1  Nov. 8, 2007

Related U.S. Application Data

(63) Continuation of application No. 11/382,220, filed on May 8, 2006, now Pat. No. 7,284,506.

(51) Int. Cl.
*F02M 43/00* (2006.01)

(52) U.S. Cl. .............. 123/1 A; 123/295; 123/299; 123/304; 123/431; 123/435; 123/575

(58) Field of Classification Search .............. 123/1 A, 123/27 GE, 299, 300, 304, 431, 435, 575, 123/295

See application file for complete search history.

(56) References Cited

U.S. PATENT DOCUMENTS

| | | | |
|---|---|---|---|
| 6,230,683 B1 * | 5/2001 | zur Loye et al. | 123/435 |
| 6,463,907 B1 | 10/2002 | Hiltner | |
| 6,550,430 B2 | 4/2003 | Gray | |
| 6,561,157 B2 * | 5/2003 | zur Loye et al. | 123/295 |
| 6,659,071 B2 * | 12/2003 | LaPointe et al. | 123/299 |
| 6,679,224 B2 | 1/2004 | Stanglmaier | |
| 6,799,558 B2 | 10/2004 | Gmelin et al. | |
| 6,959,693 B2 | 11/2005 | Oda | |
| 7,284,506 B1 * | 10/2007 | Sun et al. | 123/1 A |

(Continued)

FOREIGN PATENT DOCUMENTS

JP  2001/355471  12/2001

OTHER PUBLICATIONS

K. Aihama, et al., "Mechanism of the smokeless rich diesel combustion by reducing temperature," SAE2001-01-0655.

(Continued)

*Primary Examiner*—T. M Argenbright
(74) *Attorney, Agent, or Firm*—Allan J. Lippa; Alleman Hall McCoy Russell & Tuttle, LLP

(57) ABSTRACT

A method of operating an internal combustion engine including at least a combustion chamber having a piston disposed therein, the method comprising during a first number of cycles after start-up of the engine, supplying at least a first fuel to the combustion chamber, and combusting said first fuel and during a second number of cycles after said first number of cycles, supplying said first fuel and a second fuel to the combustion chamber to form a substantially homogeneous mixture, and compressing said mixture with said piston to cause auto-ignition of said mixture.

20 Claims, 3 Drawing Sheets

U.S. PATENT DOCUMENTS

2004/0261763 A1   12/2004   Hashimoto et al.

OTHER PUBLICATIONS

H. Akagawa, et al., "Approaches to solve problems of the premixed lean diesel combustion," SAE1999-01-0183.

M. Christensen, "Supercharged homogeneous charge compression ignition (HCCI) with exhaust gas recirculation and pilot fuel," SAE2000-01-1835.

A. Helmantel, et al., "HCCI Operation of a passenger car common rail DI diesel engine with early injection of Conventional Diesel fuel," SAE2004-01-0935.

N. Iida, et al., "Auto-Ignition and combustion of n-Butane and DME/air mixtures in a homogeneous charge compression ignition engine," SAE2000-01-1832.

T. Kaimai, et al., "Effects of a hybrid fuel system with diesel and premixed DME/Methane charge on exhaust emissions in a small DI diesel engine," SAE1999-01-1509.

T. Suzuki, et al., "Development of diesel combustion for commercial vehicles," SAE972685.

B. Walter, et al., "Development of the high power NASI concept using dual mode diesel combustion to achieve zero NOx and particulate emissions," SAE2002-01-1744.

* cited by examiner

CONTROLLING ENGINE OPERATION WITH A FIRST AND SECOND FUEL

The present application is a continuation of U.S. Ser. No. 11/382,220, titled CONTROLLING ENGINE OPERATION WITH A FIRST AND SECOND FUEL, filed May 8, 2006, the entire contents of which are incorporated herein by reference in their entirety for all purposes.

FIELD

The present application relates to controlling engine operation with at least a first fuel and a second fuel.

BACKGROUND AND SUMMARY

In some engines, diesel fuel has been used as a fuel efficient alternative to other fuels such as gasoline. In one example, air inducted into a combustion chamber of the engine is compressed by a piston and increased in temperature, while diesel fuel is injected directly into the combustion chamber to initiate combustion in the hot compressed gasses. This method forms a stratified mixture of air and diesel fuel, which when combusted may result in high production of NOx and soot, under some conditions. In another example, known as homogeneous charge compression ignition (HCCI), diesel fuel may be mixed with inducted air to form a substantially homogeneous mixture before being compressed to achieve auto-ignition of the air and fuel mixture. In some conditions, HCCI may produce less NOx and/or soot compared to stratified diesel combustion.

Under some conditions, it can be difficult to achieve a substantially homogeneous mixture with diesel fuel since it does not vaporize as readily as some other fuels such as gasoline. Furthermore, the timing of auto-ignition may be more difficult to control than stratified combustion where the injection of diesel fuel initiates combustion resulting in pre-ignition, knock or misfire. One approach used to improve the mixing of fuel, while controlling the timing of auto-ignition includes the addition of large quantities of exhaust gas recirculation (EGR). The EGR may be used to delay auto-ignition until a substantially homogeneous mixture is formed.

However, the inventors herein have also realized several disadvantages with the above approach. In particular, variations in EGR distribution between individual cylinders and/or engine cycles may result in auto-ignition of the mixture occurring too early or too late in the engine cycle. Furthermore, transient operation of the engine may exacerbate these variations, such as lag in EGR control that can result in uncertainties in combustion timing.

In one approach, at least some of the above issues may be addressed by a method of operating an internal combustion engine including at least a combustion chamber having a piston disposed therein, wherein the combustion chamber is configured to receive air, a first fuel and a second fuel to form a substantially homogeneous mixture, and wherein the piston is configured to compress said mixture so that auto-ignition of said mixture is achieved, the method comprising varying the amount of at least one of the first fuel and the second fuel that is received by the combustion chamber to adjust the timing of auto-ignition, where the first fuel includes diesel fuel.

In this manner, the combustion timing may be controlled by varying the ratio or relative amount of diesel fuel and a second lower cetane fuel utilized during each cycle. In some examples, the timing of combustion may be further controlled by adjusting the timing and/or quantity of these fuel injection(s). Thus, combustion timing control may be improved during transient engine operation and EGR usage may be reduced, thereby reducing engine pumping losses while increasing engine efficiency.

Furthermore, the inventors herein have also recognized that during cold ambient conditions, such as during engine start-up, it may be difficult to achieve HCCI operation with some fuel formulations. For example, it may be difficult to vaporize and/or ignite some low cetane fuels such as ethanol and methanol at low temperatures.

In another approach, the above issues may be addressed by a method of operating an internal combustion engine including at least a combustion chamber having piston disposed therein, wherein the combustion chamber is configured to receive a mixture of air and at least one of diesel fuel and a second fuel, the method comprising during a first condition, performing a first injection of the diesel fuel directly into the combustion chamber to form a stratified mixture of air and the diesel fuel, and to initiate combustion of the stratified mixture; and during a second condition, performing a first injection of the diesel fuel directly into the combustion chamber and a second injection of the second fuel into an air intake passage upstream of the combustion chamber to form a substantially homogeneous mixture of inducted air, diesel fuel, and the second fuel within the combustion chamber; and achieving auto-ignition of said substantially homogeneous mixture by compression ignition.

In this manner, fuel formulation can be adjusted in response to ambient conditions to improve engine start-up and warm-up operations while achieving the desired combustion timing.

DETAILED DESCRIPTION

Figure 1:
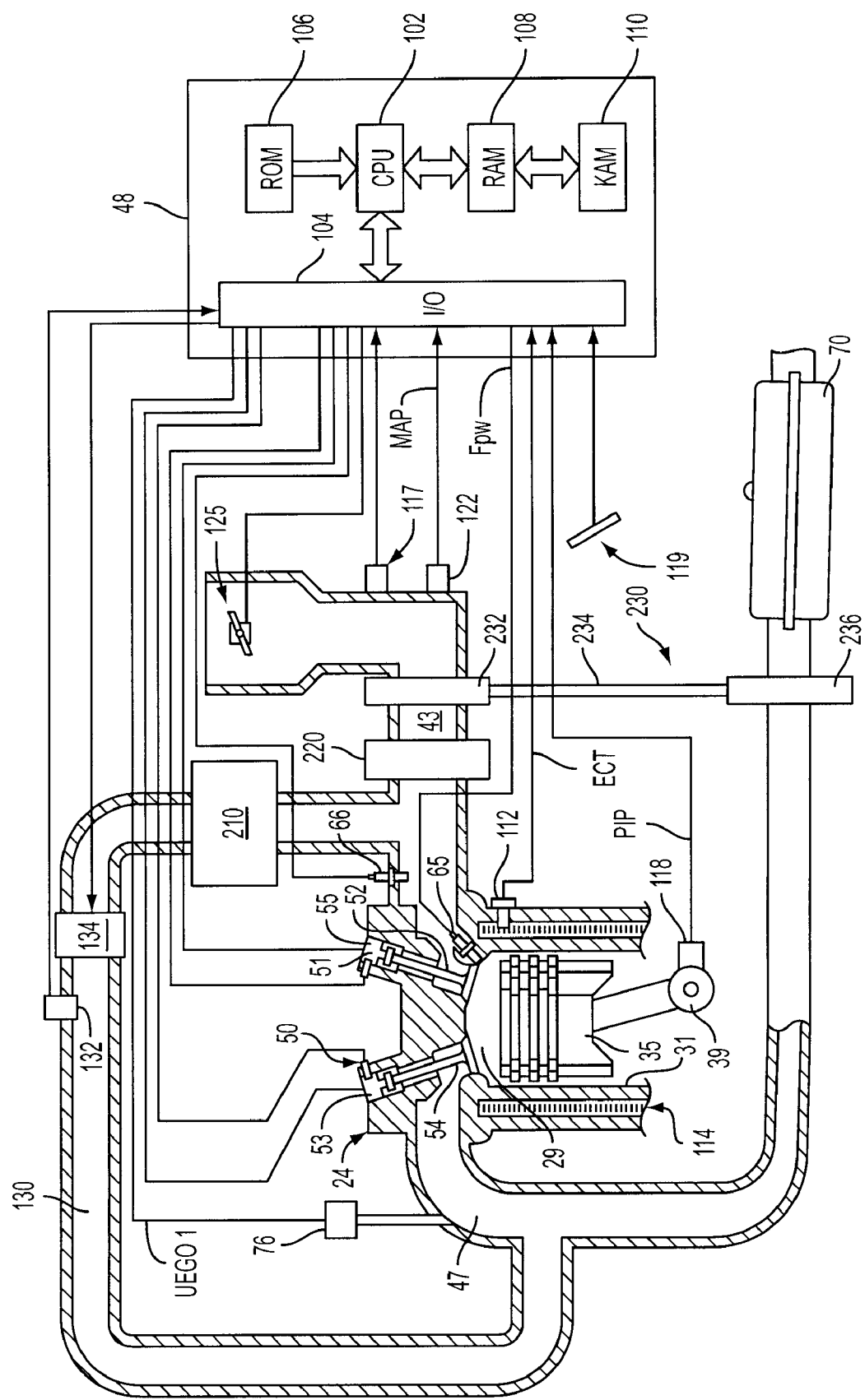
FIG. 1 shows a schematic diagram of one cylinder of an internal combustion engine.

FIG. 1 shows one cylinder of a multi-cylinder engine, as well as the intake and exhaust path connected to that cylinder. Engine 24 includes combustion chamber 29 defined by cylinder walls 31 with piston 35 positioned therein. Piston 35 is shown connected to crankshaft 39. Combustion chamber 29 is shown communicating with intake manifold 43 and exhaust manifold 47 via respective intake valve 52 and exhaust valve 54. While only one intake and one exhaust valve are shown, the engine may be configured with a plurality of intake and/or exhaust valves. In some embodiments, engine 24 may include a spark plug configured within combustion chamber 29. It should be appreciated that FIG. 1 merely shows one cylinder of a multi-cylinder engine, and that each cylinder can be configured with its own set of intake/exhaust valves, fuel injectors, spark plugs, etc.

FIG. 1 shows, intake valve 52 and exhaust valve 54 actuated by cams 55 and 53, respectively. In some examples, variable cam timing (VCT), variable valve lift (VVL), cam profile switch (CPS), among other valve control systems may be used to adjust operation of one or more of the intake and/or exhaust valves. Alternatively, electric valve actuators (EVA) may be used to control operation of valves 52 and 54, respectively. Each valve may be configured with a valve position sensor 50 that can be used to determine the position of the valve.

Engine 24 is shown having fuel injector 65 configured within combustion chamber 29 for delivering liquid fuel in proportion to the pulse width of signal FPW from controller 48, thereby providing direct injection of fuel. Engine 24 is also shown having fuel injector 66 configured within intake manifold 43 upstream of combustion chamber 29 for delivering liquid fuel in proportion to the pulse width of a signal FPW from controller 48, thereby providing port injection of a fuel. Fuel injector 65 can be configured to inject a first type of fuel, such as diesel fuel, directly into combustion chamber 29, while fuel injector 65 can be configured to inject a different fuel type into intake manifold 43. However, in an alternative embodiment, both fuel injectors may be configured to inject fuel directly into the combustion cylinder or directly into the intake manifold. In some examples, fuel injector 65 can be used to inject a fuel having a lower cetane value than diesel fuel, such as gasoline, ethanol, and methanol, among others. In some embodiments, a second fuel may be mixed with a first fuel (e.g. diesel fuel) before being injected into the combustion chamber. By changing the mixture or mixing rate of the two fuels, the ignition timing may be controlled. It should be appreciated that controller 48 may be configured to vary the quantity and/or ratio of these fuels injected via fuel injectors 65 and 66 during engine operation.

Engine 24 is further shown configured with an exhaust gas recirculation (EGR) system configured to supply exhaust gas to intake manifold 43 from exhaust manifold 47 via EGR passage 130. The amount of exhaust gas supplied by the EGR system can be controlled by EGR valve 134. Further, the exhaust gas within EGR passage 130 may be monitored by an EGR sensor 132, which can be configured to measure temperature, pressure, gas concentration, etc. In some conditions, the EGR passage may be configured with an EGR cooler 210. Under some conditions, the EGR system may be used to regulate the temperature of the air and fuel mixture within the combustion chamber, thus providing a method of controlling the timing of combustion by auto-ignition. EGR may also be used in combination with other engine control operations to adjust the timing of auto-ignition. For example, the resulting cetane value of the mixture of a first fuel and a second fuel within combustion chamber 29 may be adjusted in combination with EGR supplied to combustion chamber 29 to vary the timing of auto-ignition.

Universal Exhaust Gas Oxygen (UEGO) sensor 76 is shown coupled to exhaust manifold 47 upstream of catalytic converter 70. The signal from sensor 76 can be used to advantage during feedback air/fuel control and EGR control to maintain average air/fuel at a desired value. Furthermore, sensor 76 among other sensors can be used to provide feedback to controller 48 for the adjustment of fuel injectors 65 and 66 or throttle 125. In some examples, throttle 125 can be used to control the amount and/or concentration of EGR supplied to combustion chamber 29. FIG. 1 further shows engine 24 can be configured with an after treatment system comprising, for example, an emission control device 70. Device 70 may be a SCR catalyst, particulate filter, NOx trap, oxidation catalyst, or combinations thereof.

In some embodiments, intake passage 43 may be configured with a charge cooler 220 for cooling the intake air. In some embodiments, engine 24 may be configured with a turbocharger 230 that includes a compressor 232 configured in the intake passage 43, a turbine 236 configured in the exhaust passage 47, and a shaft 234 coupling the compressor and the turbine.

Controller 48 is shown in FIG. 1 as a conventional microcomputer including: microprocessor unit 102, input/output ports 104, and read-only memory 106, random access memory 108, keep alive memory 110, and a conventional data bus. Controller 48 is shown receiving various signals from sensors coupled to engine 24, in addition to those signals previously discussed, including: engine coolant temperature (ECT) from temperature sensor 112 coupled to cooling sleeve 114; a pedal position sensor 119 coupled to an accelerator pedal; a measurement of engine manifold pressure (MAP) from pressure sensor 122 coupled to intake manifold 43; a measurement (ACT) of engine air charge temperature or manifold temperature from temperature sensor 117; and an engine position sensor from a Hall effect sensor 118 sensing crankshaft 39 position. In one aspect of the present description, engine position sensor 118 produces a predetermined number of equally spaced pulses every revolution of the crankshaft from which engine speed (RPM) can be determined. It should be appreciated that controller 48 can be configured to perform a variety of other control engine functions such as varying the amount of EGR cooling via EGR cooler 210, charge cooling via charge air cooler 220, and/or turbocharging via turbocharger 230.

Combustion in engine 24 can be of various types/modes, depending on operating conditions. In one example, air inducted into combustion chamber 29 of engine 24 can be compressed by piston 35, while fueling of the cylinder is performed by a single injection of diesel fuel directly into the combustion chamber by fuel injector 65 to initiate combustion. This combustion mode will be referred to herein as stratified compression ignition or stratified CI. However, as described above, combustion of the stratified mixture formed during fueling of the cylinder may result in increased production of NOx and/or soot, under some conditions. In another example, known as homogeneous charge compression ignition (HCCI), diesel fuel may be mixed with air and a second fuel inducted via intake manifold 43 to form a substantially homogeneous mixture before being compressed to achieve auto-ignition of the mixture. In some conditions, diesel HCCI may produce less NOx and/or soot compared to stratified compression ignition with diesel fuel.

As will be described below, diesel HCCI may be achieved by controlling the timing of auto-ignition of the homogeneous mixture via fuel formulation. For example, the fuel formulation may be adjusted during each engine cycle by mixing diesel fuel having a substantially high volatility or ignitability with a second fuel having a lower cetane value (e.g. gasoline, ethanol, methanol, etc.), which has a lower volatility or ignitability, thereby varying the timing of auto-ignition. As will be described below with reference to FIGS. 2-7, the relative and/or absolute amounts of diesel fuel and a second fuel (e.g. lower cetane fuel) may be varied in response to operating conditions of the engine to maintain the desired combustion timing.

However, in some conditions, such as during cold ambient conditions, it may be more difficult to vaporize and/or ignite some low cetane fuels such as ethanol and methanol. Thus, it may be difficult to utilize two fuels to achieve HCCI operation during these conditions. Therefore, stratified CI using diesel fuel may be utilized during cold operating conditions, such as when the engine is below a prescribed temperature, during engine start-up or warm-up, wherein diesel fuel is injected into the combustion cylinder to initiate combustion.

In some embodiments, the engine may be configured to vary the combustion mode based on the operating load and/or speed of the engine. For example, the engine may be configured to operate in HCCI mode during intermediate load conditions, while the stratified CI mode may be used at higher and/or lower load conditions. Furthermore, the engine may be configured to default to the stratified CI mode when the second fuel is unavailable, such as when the amount of the second fuel stored in a fuel tank is below a threshold.

In some examples, the engine described above may be configured to achieve a greater than 15:1 compression ratio. Furthermore, the engine may be configured to vary the combustion mode and/or transition between combustion modes without adjusting the compression ratio of the engine. For example, the engine may be configured to operate in a stratified diesel CI mode during engine warm-up and/or low engine load conditions, while transitioning to HCCI mode during other conditions without varying the actual compression ratio. In some embodiments, the compression ratio may be varied in different combustion modes (e.g. a Miller cycle may be used). For example, the compression ratio during a mode where only diesel fuel is injected may be different than the compression ratio during a mode where both a diesel fuel and a second fuel are injected.

FIGS. 2-6 show example injection strategies for a cylinder of engine 24 described above with reference to FIG. 1. In particular, FIGS. 2-6 show one or more injections of diesel fuel (shown as an un-shaded bar) and/or a lower cetane fuel (shown as a shaded bar). A four stroke engine cycle including an exhaust stroke, an intake stroke, a compression stroke, and an expansion stroke are shown along with the position of the piston at bottom dead center (BDC) and top dead center (TDC). Example, intake and exhaust valve events are shown as a curve representing valve lift. It should be appreciated that the intake and exhaust valve events shown in FIGS. 2-6 are merely representative of the intake and exhaust strokes, as other valve lift and valve timing may be used.

Figure 2:
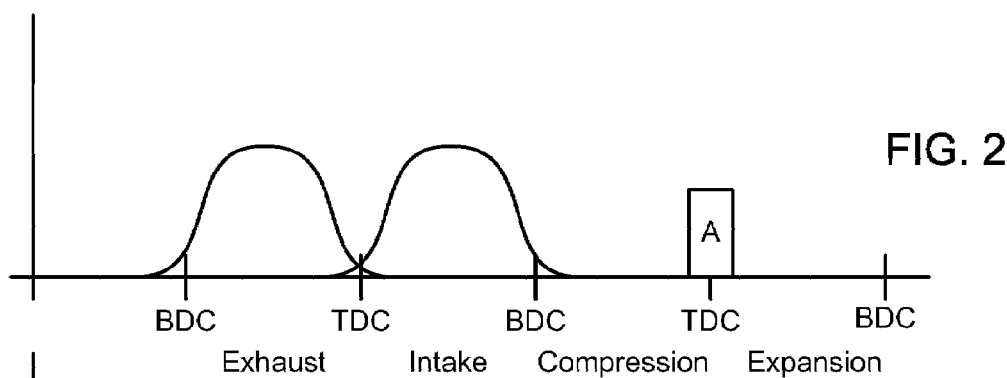
FIGS. 2-6 show timing diagrams for one cylinder of an internal combustion engine.

FIG. 2 shows an example injection strategy as may be used to achieve stratified CI with diesel fuel. For example, a single direct injection (A) of diesel fuel can be performed around TDC of the expansion stroke causing combustion by compression ignition. The timing of combustion may be adjusted by varying the timing of the injection of diesel fuel. For example, if combustion timing is to be advanced, the timing of injection may be advanced and vice-versa.

Figure 3:
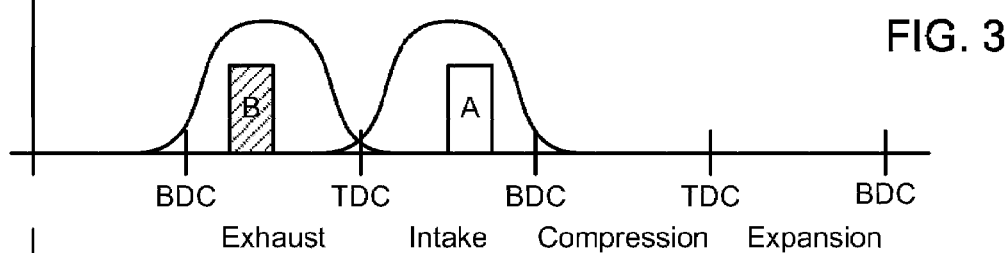

FIG. 3 shows an injection strategy for achieving a HCCI operation with two fuels. In particular, a single port injection (B) of a low cetane fuel may be performed, for example, during the intake stroke, and a single direct injection (A) of diesel fuel may be performed, for example, during the compression stroke. In this manner, a substantially homogeneous mixture may be formed. Thus, a second fuel having a low cetane number (e.g. gasoline, ethanol, methanol, etc.) may be injected into the intake manifold before the intake valve closes to promote vaporization of the second fuel, while a direct injection of diesel fuel may be performed before TDC of the compression stroke to facilitate ignition of inducted air and low cetane fuel.

Figure 4:
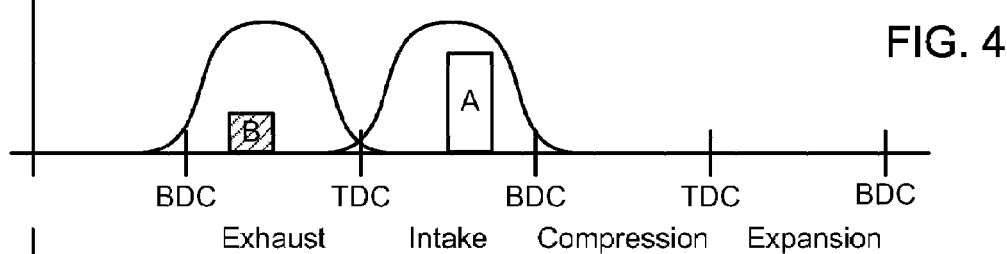

The auto-ignition of the substantially homogeneous mixture may be controlled by adjusting one or more conditions of the fuel injection strategy among other operating conditions of the engine. In one example, the timing auto-ignition of the dual fuel mixture may be controlled by varying the relative amounts (i.e. ratio) of the diesel fuel and the second fuel utilized during each cycle. For example, if auto-ignition timing is to be advanced (i.e. occur earlier in the cycle), the amount of the diesel fuel can be increased in comparison to the amount of second fuel (i.e. low cetane fuel) injected or inducted into the combustion chamber. Alternatively, if the auto-ignition timing is to be retarded (i.e. occurring later in the cycle), the amount of diesel fuel injected can be decreased in comparison to the amount of the second fuel injected or inducted into the combustion chamber. Thus, FIG. 4 shows an example injection strategy where the amount of diesel fuel injected (A) is increased in relation to the amount of low cetane fuel injected or inducted (B).

Figure 5:
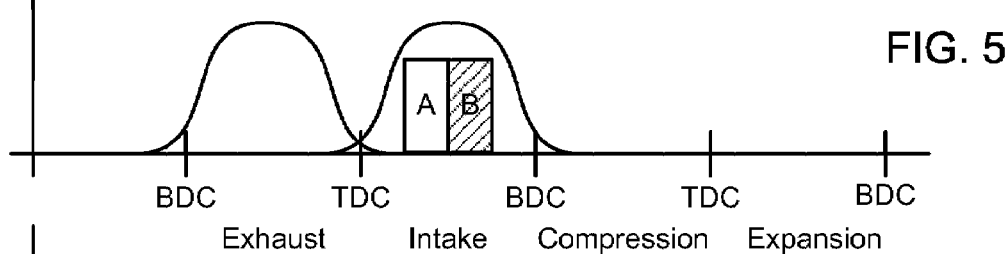

In another example, the timing of combustion by auto-ignition may be controlled by adjusting the timing of one or more of the injections. For example, FIG. 5 shows a first injection (A) of diesel fuel and a subsequent second injection (B) of low cetane fuel during the intake stroke.

Figure 6:
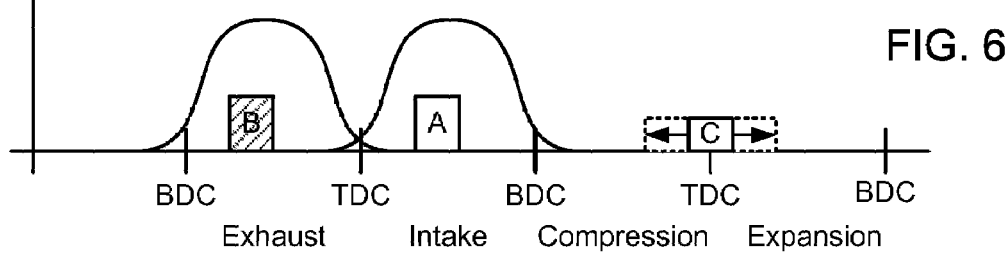

In yet another example, multiple injections of diesel fuel and/or low cetane fuel may be performed. For example, FIG. 6 shows an injection of low cetane fuel (B) during the intake stroke followed by a first injection of diesel fuel (A) during the compression stroke. FIG. 6 shows a subsequent second injection of diesel fuel (C) performed around TDC between the compression and expansion stroke to initiate combustion. Under some conditions, an additional injection of diesel fuel may be performed to initiate auto-ignition of the substantially homogeneous mixture as described above with reference to FIG. 2. Thus, in some examples, auto-ignition of the substantially homogenous mixture may be controlled by varying the timing of injection of diesel fuel (C). It should be appreciated that while the rich region formed by the second subsequent injection of diesel fuel (C) may form a partially stratified mixture, some increases in efficiency and/or engine emission reduction may be achieved over stratified CI, while ensuring auto-ignition occurs at the desired timing.

In some embodiments, the engine may utilize some or all of the fuel injection strategies described above. During some conditions, the engine may operate in a stratified diesel CI mode as described in FIG. 2, while during other conditions the engine may operate with a substantially homogeneous mixture of diesel and a second fuel as described in FIGS. 3-5. For example, the engine may operate in a stratified CI mode during low engine temperature conditions and HCCI mode during higher engine temperatures. In another example, the engine may utilize stratified CI at some engine loads and/or speeds where it may be difficult to utilize HCCI. In yet another example, stratified CI may be used when a second low cetane fuel is unavailable, as may occur during extend operation without refueling. Furthermore, during some conditions, auto-ignition of a substantially homogeneous mixture may be initiated by a second injection of diesel fuel, as shown in FIG. 6. Thus, the engine may be configured to transition between stratified CI of FIG. 2 and a multi-fuel HCCI operation of FIGS. 3-5. Furthermore, these transitions may be facilitated by using the strategy described by FIG. 6. For example, when transitioning from the operation of FIG. 2 to FIGS. 3-5, the amount of diesel fuel injected around TDC of the expansion stroke may be reduced over one or more engine cycles, while the amount of low cetane fuel may be increased to take over control of the auto-ignition timing. Therefore, a small injection of diesel fuel may be used to initiate auto-ignition during the transition so that misfire is avoided. Likewise, the engine may be transitioned from HCCI to stratified CI by reversing this process.

It should be appreciated that the timing, amount, and quantity fuel injections described herein are merely examples and that other injection strategies are possible. For example, the engine may be configured to enable one or more injections of diesel fuel and/or a second fuel during any or all of the exhaust, intake, compression, and expansion strokes.

Figure 7:
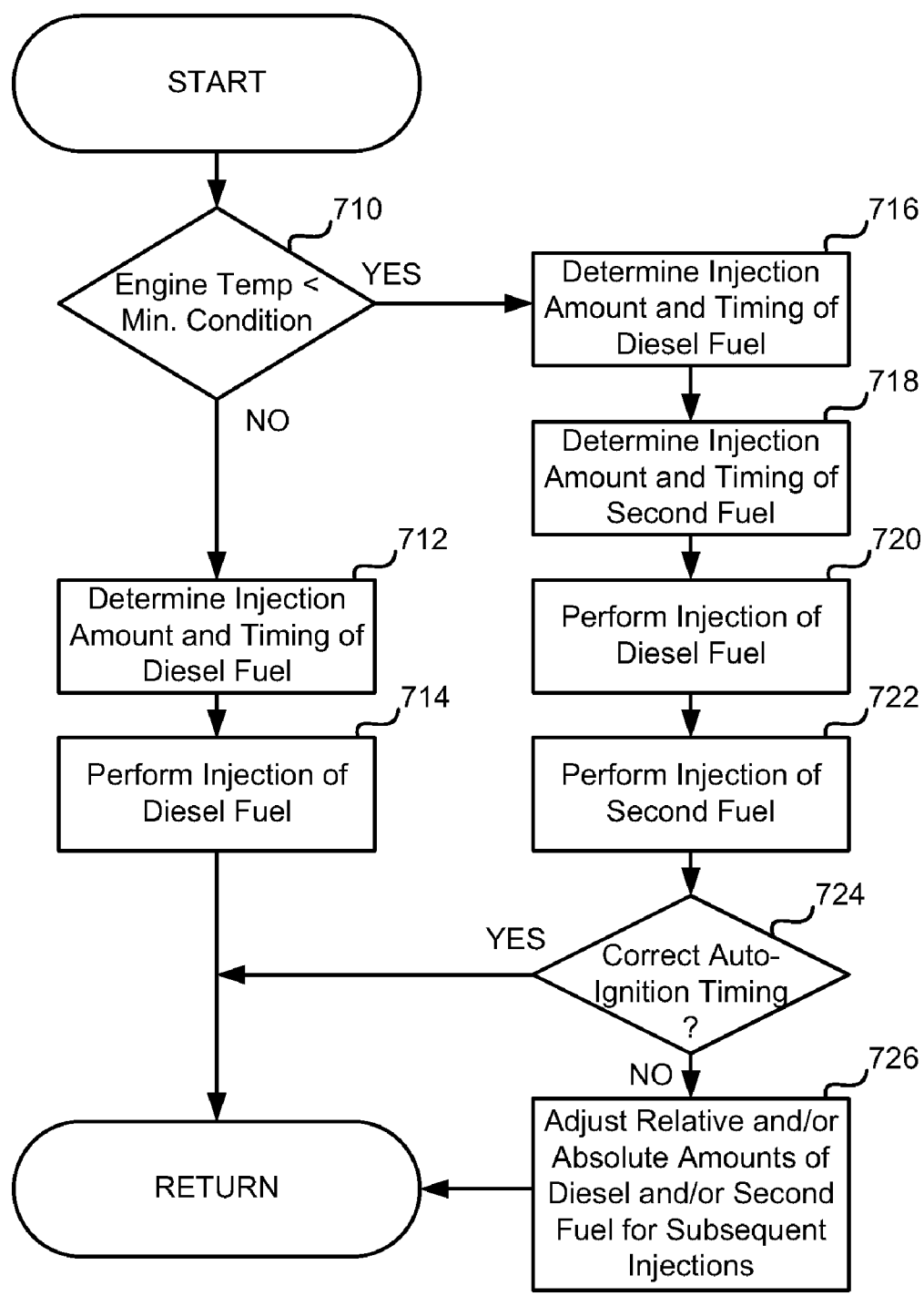
FIG. 7 shows a flow chart of an example control strategy.

Referring now to FIG. 7, a flow chart of an example engine control strategy is shown. Beginning at 710, it may be judged whether the engine temperature is below a prescribed temperature. For example, at low temperatures, it may be difficult to vaporize and/or combust some low cetane fuels, such as during a cold start and/or engine start-up, among other conditions. During these conditions, the engine may operate in a stratified CI mode where only diesel fuel is used or a substantially larger amount of diesel fuel is used in comparison to a second fuel, such as described above with reference to FIG. 2. Thus, if the answer at 710 is no (i.e. the engine temperature is lower than a prescribed condition), then a determination is made of the amount and/or timing of the diesel fuel injection (712). At 714, an injection of diesel fuel is performed to initiate combustion as determined at 712. However, in some conditions, two or more injections of diesel fuel and/or a second fuel may be performed.

Alternatively, if the answer at 710 is yes (e.g., the engine temperature is greater than a prescribed temperature), then a determination of the amount and timing of the diesel fuel and/or second fuel injections are made at 716 and 718, respectively. The amount, timing, and quantity of these fuel injections may be determined based on feedback from one or more sensors described above with reference to FIG. 1 as well as other engine operating conditions and/or ambient conditions. Next, at 720 and 722, the diesel injection(s) and/or second fuel injection(s) is/are performed as determined by 716 and 718.

At 724 it is judged whether the desired auto-ignition timing has occurred and if not, then the subsequent fuel injections may be adjusted accordingly. Thus, if the answer at 724 is yes, the routine returns to 710 to begin the next engine cycle. Alternatively, if the answer at 724 is no, then the subsequent fuel injection(s) may be adjusted in response to the error between the desired timing of auto-ignition and the detected timing of auto-ignition. As described above with reference to FIGS. 2-6, the timing of auto-ignition may be adjusted by varying the ratio of diesel and second fuels injected, the absolute amount of each injection, the time of injection, etc. Furthermore, the timing of auto-ignition may also be adjusted by varying an operating condition(s) of the engine such as EGR amount, turbocharging, supercharging, valve timing, throttle position, and air/fuel ratio, among others and combinations thereof. In some embodiments, the relative amount and/or absolute amount of the fuel injection(s) may be adjusted in response to feedback from an exhaust gas emission sensor located downstream of the combustion cylinder (s). In another example, the fuel injection(s) may be adjusted in response to the temperature of the exhaust gas, among other forms of control feedback.

Note that the example control and estimation routines included herein can be used with various engine and/or hybrid propulsion system configurations. The specific routines described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the described steps may graphically represent code to be programmed into the computer readable storage medium in controller 48.

It will be appreciated that the configurations and routines disclosed herein are exemplary in nature, and that these specific embodiments are not to be considered in a limiting sense, because numerous variations are possible. For example, the above technology can be applied to V-6, V-8, I-4, I-6, V-10, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed:

1. A method of operating an internal combustion engine including at least a combustion chamber having a piston disposed therein, the method comprising:
    during a first number of cycles after start-up of the engine, supplying at least a first fuel to the combustion chamber, and combusting said first fuel; and
    during a second number of cycles after said first number of cycles, supplying said first fuel and a second fuel to the combustion chamber to form a substantially homogeneous mixture, and compressing said mixture with said piston to cause auto-ignition of said mixture.

2. The method of claim 1 further comprising, during said second number of cycles, varying an amount of at least one of the first fuel and the second fuel that is delivered to the combustion chamber to adjust a timing of auto-ignition.

3. The method of claim 1, wherein said first fuel includes diesel and said second fuel includes ethanol.

4. The method of claim 1, wherein said first fuel includes diesel and said second fuel includes gasoline.

5. The method of claim 1, wherein said first fuel is delivered to the combustion chamber via a first fuel injector and said second fuel is delivered to the combustion chamber via a second fuel injector.

6. The method of claim 1, wherein said first fuel injector is configured as a direct injector and said second fuel injector is configured as a port injector.

7. The method of claim 1, wherein said first fuel and said second fuel are delivered to the combustion chamber via a common fuel injector.

8. The method of claim 1, wherein auto-ignition of said first fuel and said second fuel is initiated by an injection of at least one of the first fuel and the second fuel.

9. A method of operating an internal combustion engine including at least a combustion chamber having a piston disposed therein, the method comprising:
    varying a relative amount of a first fuel and a second fuel delivered to the combustion chamber in response to a temperature of the engine; and
    during at least a first temperature condition of the engine, auto-igniting said first fuel and said second fuel that are delivered to the combustion chamber.

10. The method of claim 9 further comprising, during said first temperature condition, varying said relative amount of at least one of the first fuel and the second fuel that is delivered to the combustion chamber to adjust a timing of auto-ignition.

11. The method of claim 9, wherein said first fuel includes diesel fuel and said second fuel includes ethanol.

12. The method of claim 9, wherein said first fuel includes diesel fuel and said second fuel includes gasoline.

13. The method of claim 9, wherein said first fuel is delivered to the combustion chamber via a first fuel injector and said second fuel is delivered to the combustion chamber via a second fuel injector.

14. The method of claim 9, wherein said first fuel injector is configured as a direct injector and said second fuel injector is configured as a port injector.

15. The method of claim 9, wherein said first fuel and said second fuel are delivered to the combustion chamber via a common fuel injector.

16. The method of claim 9, wherein auto-igniting said first fuel and said second fuel includes compressing the first fuel and the second fuel via the piston.

17. The method of claim 9, wherein said first fuel and said second fuel are mixed with air to form a substantially homogeneous mixture before said auto-igniting.

18. The method of claim 9, wherein auto-ignition of said first fuel and said second fuel is initiated by an injection of at least one of the first fuel and the second fuel.

19. An engine system for a vehicle, comprising:
at least one combustion chamber;
a piston disposed within the combustion chamber;
a direct injector configured to inject diesel fuel directly into the combustion chamber;
a port injector configured to inject a second fuel into an air intake port coupled to the combustion chamber;
a control system configured to vary a relative amount of the diesel fuel and the second fuel delivered to the combustion chamber in response to a temperature of the engine;
wherein said control system is configured to, during at least a first temperature condition of the engine, vary an operating condition of the engine so that said diesel fuel and said second fuel are compressed by the piston and auto-ignited.

20. The system of claim 19, wherein said control system is further configured to, during said first temperature condition, vary an amount of at least one of the diesel fuel and the second fuel that is delivered by the combustion chamber to adjust a timing of auto-ignition and wherein the second fuel includes at least one of ethanol, methanol, and gasoline.

* * * * *